Sept. 9, 1930.  L. E. BEAMAN  1,775,084
MILLING MACHINE UNIT HEAD
Filed March 2, 1928  5 Sheets-Sheet 1

Inventor
Lora E. Beaman
By Attorneys

Sept. 9, 1930.    L. E. BEAMAN    1,775,084
MILLING MACHINE UNIT HEAD
Filed March 2, 1928    5 Sheets-Sheet 2
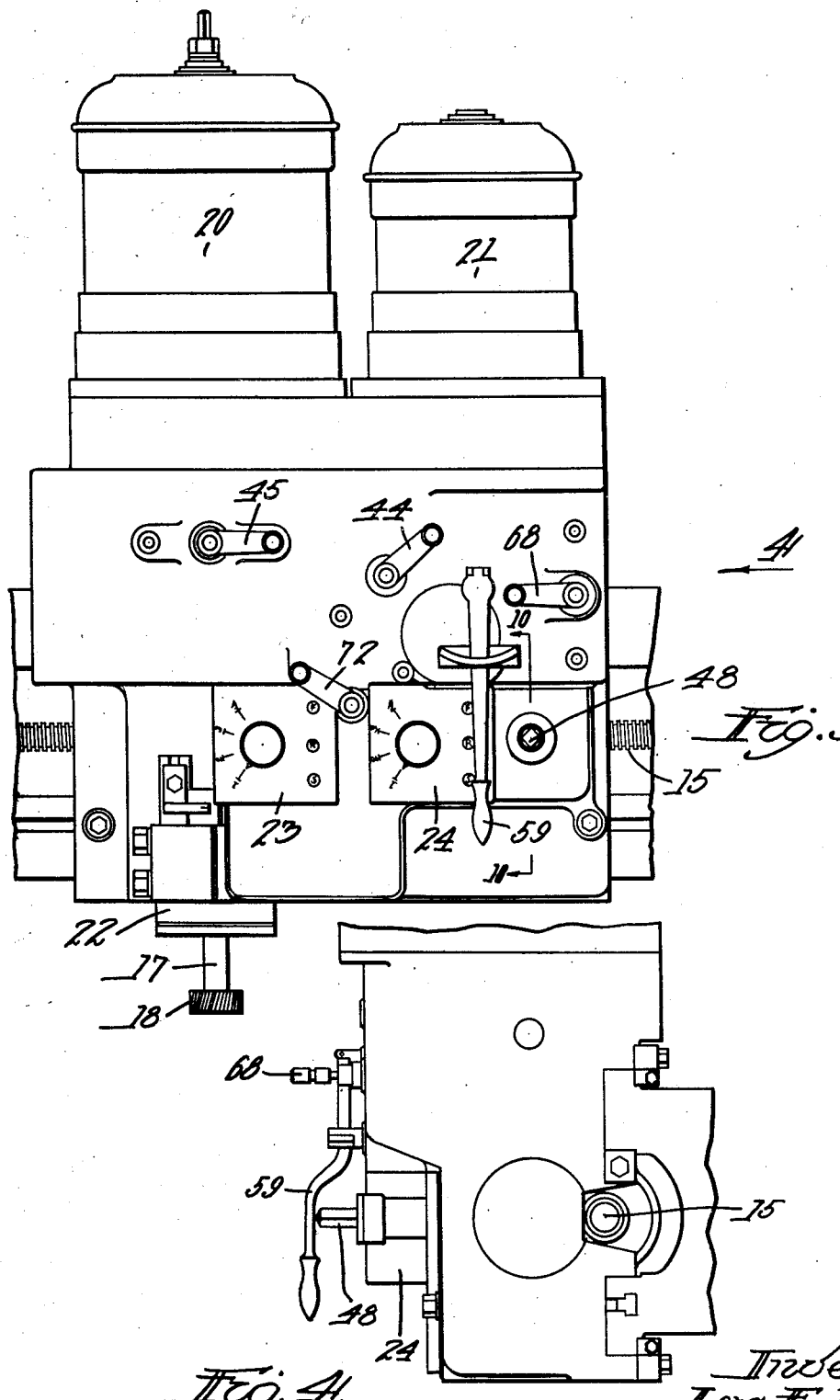

Sept. 9, 1930.　　　L. E. BEAMAN　　　1,775,084
MILLING MACHINE UNIT HEAD
Filed March 2, 1928　　　5 Sheets-Sheet 3

Inventor
Lora E. Beaman
By Attorneys

Sept. 9, 1930.  L. E. BEAMAN  1,775,084
MILLING MACHINE UNIT HEAD
Filed March 2, 1928   5 Sheets-Sheet 5

Inventor
Lora E. Beaman
By Attorneys

Patented Sept. 9, 1930

1,775,084

UNITED STATES PATENT OFFICE

LORA E. BEAMAN, OF FITCHBURG, MASSACHUSETTS, ASSIGNOR TO SHAW-CRANE-PUTNAM MACHINE COMPANY, INC., OF FITCHBURG, MASSACHUSETTS, A CORPORATION OF DELAWARE

MILLING-MACHINE UNIT HEAD

Application filed March 2, 1928. Serial No. 258,599.

This invention relates to a head for a milling machine or other metal working machine employing a rotary tool. The invention is designed for the purpose of concentrating in a small space in a single unit, the power and mechanism for driving the cutter spindle and the power and mechanism for feeding or fast traversing the unit along some other member and to provide in this unit one or any number of speeds for the spindle in either direction and one or any number of feeds for moving the unit bodily in either direction and also one or more rates of fast traverse for the unit and furthermore to provide one or more feeds and fast traverse for the quill carrying the cutter spindle, in either direction.

The invention is adapted to be used in connection with a cutter carrying unit on many types of milling machines and machines of a similar character for drilling, boring, tapping, etc. The unit is intended to be used alone or in combination with one or several similar units, some of them movable if desired along horizontal ways and others along vertical ways. In all cases it can be attached to some member carrying a work table, which table can move the work past the cutters while the unit or units carrying them remain stationary, or the work table can remain stationary while the unit moves the cutters along the work. A number of units can be arranged at will to mill off the work upon three sides or in fact on the ends of the work, if desired, so as to operate on five sides with one setting of the work and three operations of the machine. The variety of work suitable for being operated upon by this unit head, either singly or in combination with others, is so great that the work can be supported in any desired way and the units can be constructed in various designs. A plurality of these units, which need not necessarily be milling heads, can be mounted on the same supporting member and movable independently of each other therealong at different speeds, or some can be stationary while others are movable to perform the desired operation and, as stated, they may be arranged in groups along ways at right angles to each other. It is preferred to apply power to each unit by means of a plurality of electric motors, each mounted on and carried by its own unit although some of the combinations herein described can be driven in other ways. In any event this is a self-contained unit.

From what has been said it will be seen that this invention has for its objects the provision of a self-contained unit carrying its motor power, preferably having one motor to drive the spindle in one or both directions and a second motor to drive the feeds and fast travel in both directions, that is, the feed for moving the unit and the feed for moving the quill longitudinally; to provide a combination of these units on the same machine adapted to give the several spindles the same number of revolutions per minute, or different numbers, as conditions may require, and so that each spindle can be operated in either direction and at any speed independently of the others and each unit can travel independently of the others so as to secure a high degree of flexibility; to provide for mounting the motors on the unit to effect a saving in the power required to drive the cutter and feeds; to provide a self-contained unit which can be placed in any plane required by the work to be performed; to provide a unit which embodies in its design the features for making it adjustable for milling, drilling, boring, tapping and other special operations; to arrange the head in such a manner that the gears and other parts are protected by the casing and to insure the flexibility of the device as to the character of the work and the relation between the speeds and feeds.

Other objects and advantages of the invention will appear hereinafter.

Reference is to be had to the accompanying drawings in which

Fig. 3 is a front elevation of one of the units on enlarged scale;

Fig. 4 is an end view of the same as indicated by the arrow 4 in Fig. 3;

Figure 1:
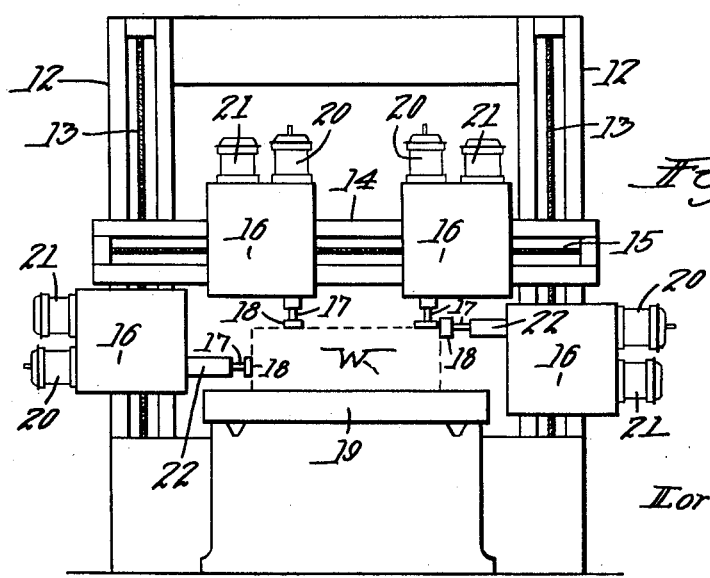
Fig. 1 is a front view of a milling machine frame constructed so as to afford a plurality of units, said units being individually movable in two directions.
Figure 5:
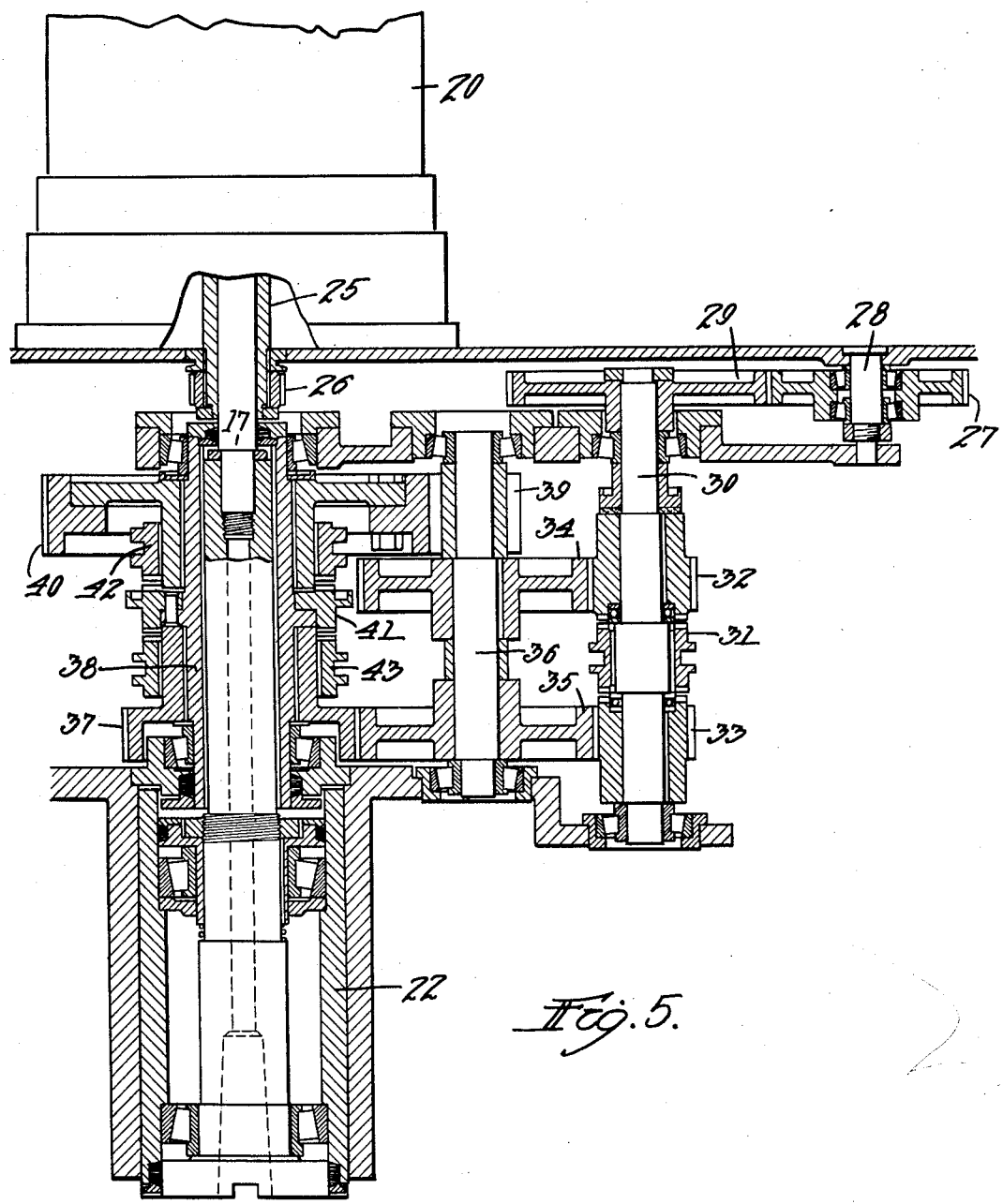
Fig. 5 is a sectional view developed on the broken line A—B—C—D of Fig. 2 showing the means for rotating the spindle for cutting at four speeds using a constant speed motor, or sixteen speeds using a multi-speed motor, or indefinite number of speeds using an adjustable speed motor.

In Fig. 1 the general arrangement of a machine is shown illustrating how the unit head constituting the subject matter of this invention can be employed on a well known type of machine tool. Here the machine tool is shown as provided with upright mechanical ways 12 carrying their vertical screws 13 along which slides a cross-rail 14 which can be adjusted by the said screws. No means is shown for adjusting the cross-rail up and down as any well known means can be employed. After the cross-rail is set, these screws act as racks as will appear. The cross-rail also is provided with horizontal ways and is provided with a horizontal screw 15 for moving the heads along the cross-rail, and during the operation of these heads, to remain stationary.

I have illustrated, supported on the cross-head, two of these units 16 adapted obviously to be fed along the screw 15 and each having a spindle 17 which carries a milling or other cutting tool 18 at the end for operating on the work W. Two other units 16 are shown connected with the vertical screws 13 and movable up and down and having horizontal spindle 17 adapted to work on the sides of the work or even on the ends, if that is desired.

The work W is shown as mounted on a planer type table 19, the reciprocation of which table will permit the use of these tools for ordinary machining operations, but it will be understood that this particular framework is shown for illustrative purposes only and that the machine can be arranged in many other ways, the essential feature of which is that the several units 16 can be arranged practically at will, and the work can be mounted movably or in stationary position.

The relationship of the several heads in Fig. 1 is, of course, for illustrative purposes to show that they can be so arranged as to have a very flexible range of action. The invention lies in the arrangement of the head itself.

In the first place it may be stated that each of these heads is shown as provided with two alternating or direct current motors 20 and 21. In the present instance the motor 20 is shown as connected with mechanism for the purpose of rotating the spindle only, but is so connected as to rotate it in either direction by reversing the motor. The motor 21 is connected to feed the unit along the screw 13 or 15, as the case may be, forward and back and at different speeds and also to feed the quill 22 of the spindle 17 in and out at varying speeds. This also, it will be seen, provides for great flexibility in the work to be performed.

Each of the motors is provided with a master control box for regulating the speeds of the motors. These control boxes may be mounted on the head as shown by box 23 for motor 20 and box 24 for motor 21, or they may be mounted remote from the head. In either case, however, a push button control would be provided on each head for starting and stopping the drive motor 20 and starting, stopping and reversing the feed and traverse motor 21.

Figure 6:
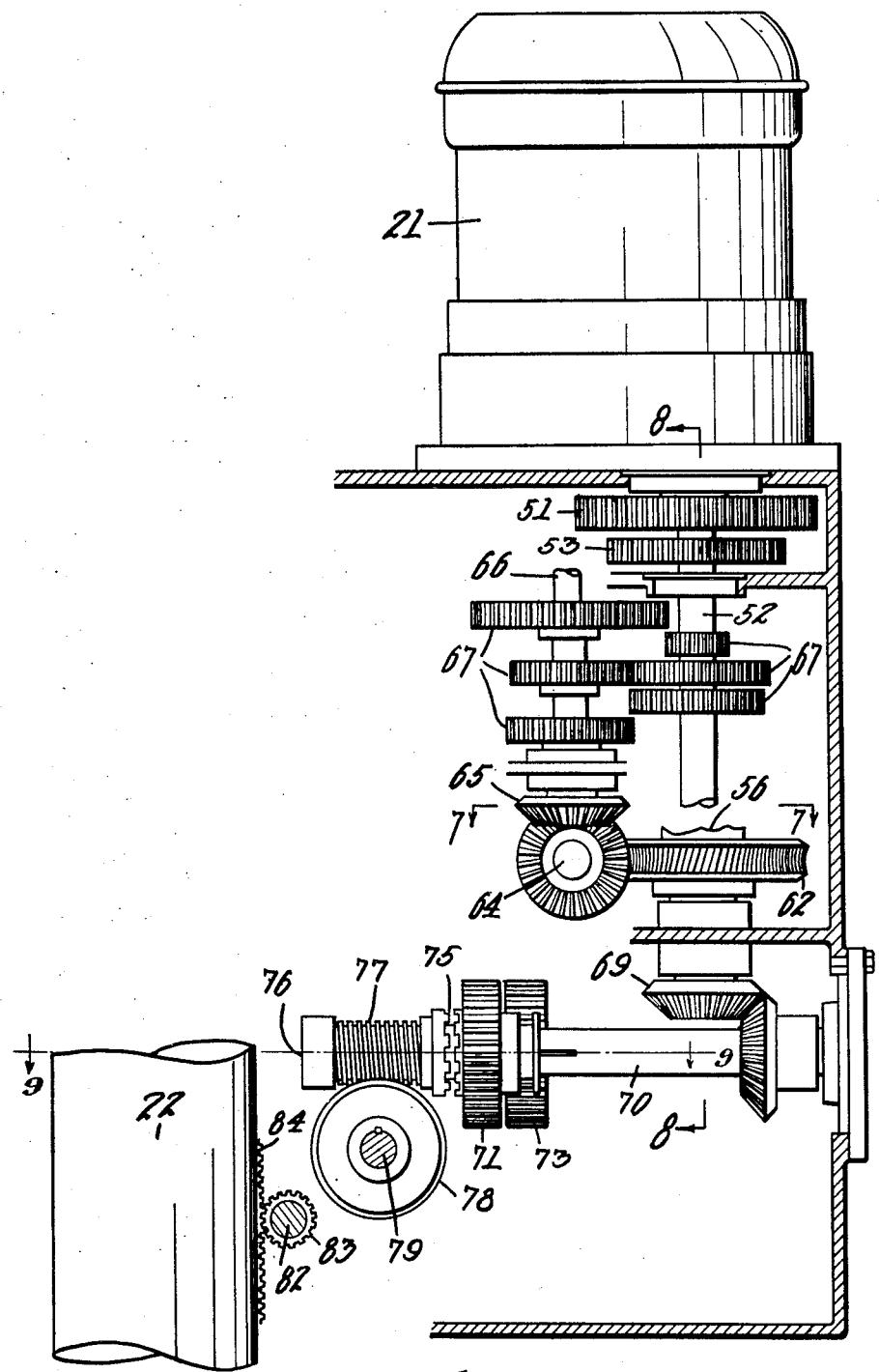
Fig. 6 is an elevation partly in section of the other end of the unit showing the gearing for operating the feeds and fast traverse for head and quill in both directions and at independent speeds from the other motor.

Now referring to the motor 20, which I call the driving motor, it is mounted concentrically with the spindle 17 but does not drive this spindle directly. To the motor armature shaft 25 is splined a gear or pinion 26 which meshes with a gear 27 shown as laid out in a different position in Fig. 6 in accordance with the section line A—B—C—D and mounted on a shaft 28. This gear drives a gear 29 keyed on a shaft 30 on which is slidingly keyed a clutch section 31. This clutch section is designed to be moved back and forth to connect the shaft with either one of a pair of gears 32 and 33. These gears drive, when connected, a pair of gears 34 and 35 on a shaft 36. These two gears are not exactly of the same size. The gear 35 is keyed on the shaft 36 and the gear 34 is also keyed to the shaft 36. The gear 35 meshes with a gear 37 which is free to turn on a sleeve 38 mounted on the spindle 17.

The shaft 36 has keyed to it a pinion 39 meshing with a gear 40, which is rotatably mounted on the sleeve 38. This sleeve is provided with a double ended clutch member 41 and the hubs of the two gears 37 and 40 are provided with sliding clutch members 42 and 43, either of which can be moved to engage the clutch member 41 and cause the sleeve 38 to be rotated positively, either with the gear 37, or with the gear 40, which obviously rotate it at different speeds in the same direction. The clutch sections 42 and 43 are operated together and the two are connected together so that of course they cannot both be engaged with the section 41 at the same time. This constitutes the entire driving mechanism for rotating the spindle 17 which is slidably keyed to the sleeve 38. It is reversed by reversing the motor.

The clutch 31 is operated by the usual mechanism comprising a handle 44 and the two clutch sections 42 and 43 are both operated in a similar way by a handle 45. The rotary parts are mounted on roller bearings and rigidly supported as shown.

Figure 2:
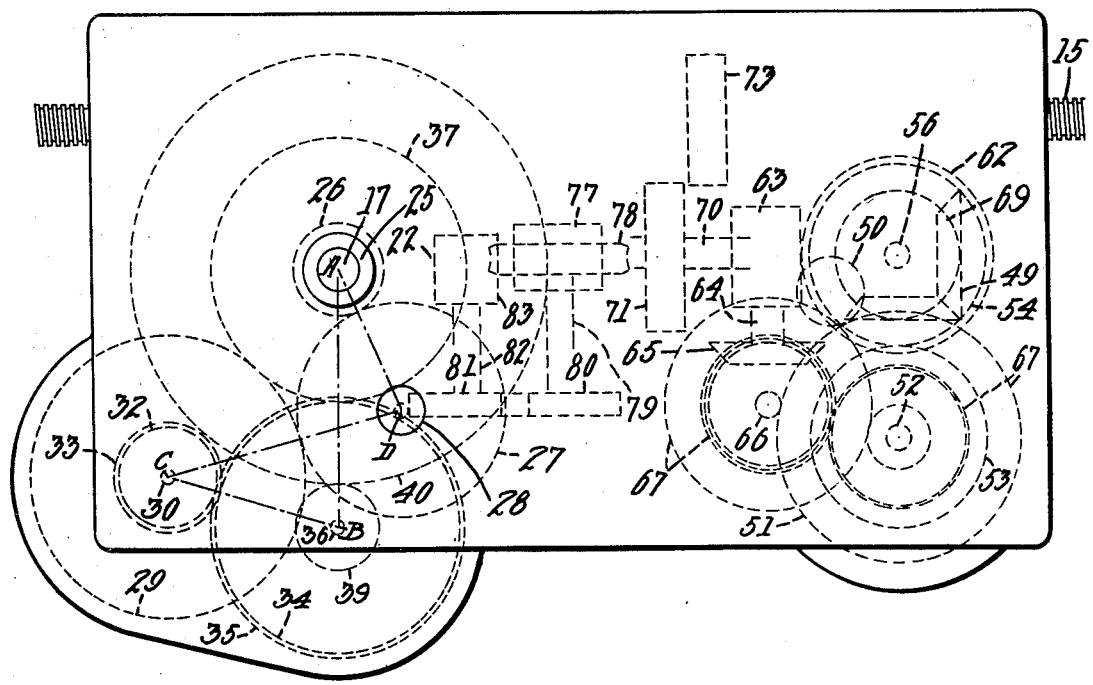
Fig. 2 is a plan of one of these units showing diagrammatically the relation of the means for driving the parts in either direction and at varying speeds.

The two motors 20 and 21 are usually run entirely independently of each other. However, they can be connected up electrically so that when one stops the other stops also or so that the stopping of the second can be controlled by the operator, as he may desire. In Fig. 2 the motor 21 is provided with a pinion 50 on its shaft which operates a gear 51 on a vertical shaft 52 which may be considered the driving shaft for feeding or traversing the whole unit along the screw 13 or 15, as the case may be, in either direction and for moving the quill 22 up and down. The shaft 70 has a bevel gear 49 driving a shaft 48 having a square end projecting out of the unit. A crank can be applied to it to operate these parts by hand for preliminary adjustment.

Figure 7:
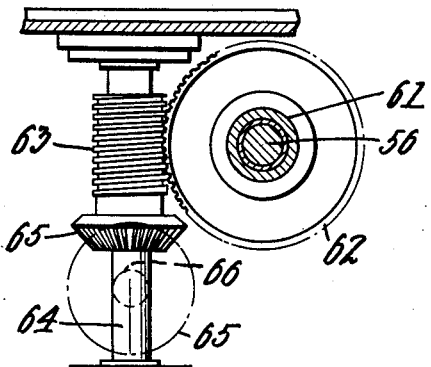
Fig. 7 is a sectional view on the line 7—7 of Fig. 6.
Figure 8:
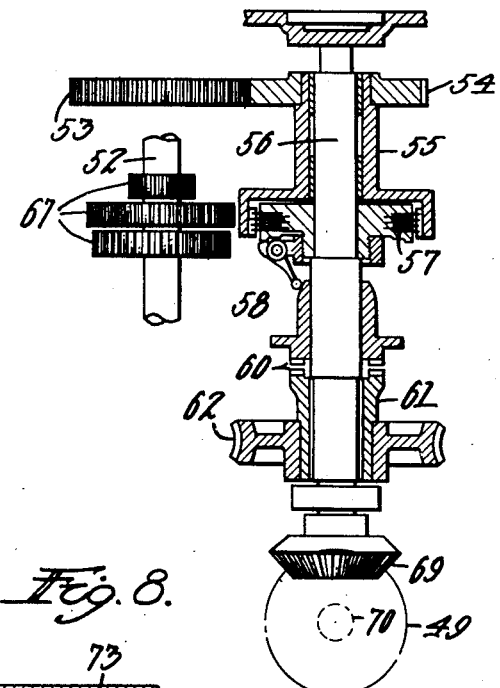
Fig. 8 is a sectional view on the line 8—8 of Fig. 6.

In Fig. 8 on the driving shaft 52 is a gear 53 meshing with a gear 54 fixed to a sleeve 55 loose on another vertical shaft 56. This sleeve 55 is provided with a clutch 57 for fixing it to the shaft 56 when the clutch is closed and driving that shaft directly. However, this is the connection for traversing the unit or the quill. On the shaft 56 is a clutch operating member 58 slidingly keyed to it and adapted to be operated by an arm 59 (Fig. 3). As stated, when in one position this closes the clutch 57 and drives the shaft 56 through the gear 53. When in the other extreme position it closes a clutch 60 and drives the shaft 56 from a rotatably mounted sleeve 61 and having fixed to it a worm wheel 62. In Fig. 7 this worm wheel is adapted to be operated by a worm 63 on a shaft 64 driven by bevel gears 65 from another vertical shaft 66 in Fig. 7. The shaft 66 is driven from the shaft 52 through speed change gearing comprising a series of gears 67. One set of these gears is shiftable along its shaft and they can be connected up to provide three speeds. The speed change gears are operated by a lever 68 in Fig. 3. Now, it will be seen that the shaft 52 drives the shaft 66 through speed change mechanism and this shaft 66 through the worm 63 and worm wheel 62 drives the shaft 56 at a slow feeding speed.

Figure 9:
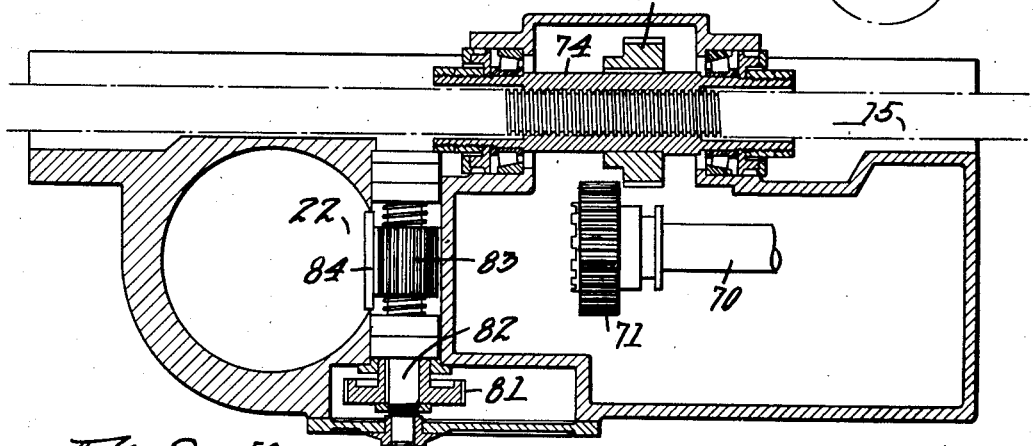
Fig. 9 is a sectional view on the line 9—9 of Fig. 6.

The shaft 56 has at its lower end a bevel gear 69 driving the horizontal shaft 70. In Fig. 9 the shaft 70 is provided with a gear 71 slidably splined thereon and operated by a handle 72, as shown in Fig. 3. It can be brought into mesh with the gear 73 which is fixed to a nut 74 on the screw 15 or 13, as the case may be. It will be seen therefore that by the above described mechanism this nut can be turned along the stationary screw to move the whole unit along that screw by power at varying feeding speeds and at a rapid traverse speed.

Figure 10:
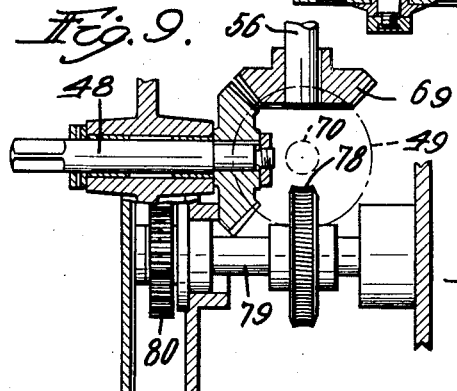
Fig. 10 is a sectional view on the line 10—10 of Fig. 3.

Through the above mechanism another operation can take place. The sliding gear 71 (Fig. 6) can be moved over so that a clutch 75 thereon will engage a corresponding clutch member on a sleeve 76 having a worm 77 integral therewith. This worm turns a worm gear 78 on a horizontal shaft 79. On this shaft is a gear 80 (Fig. 10) meshing with a gear 81 (Fig. 9) on a shaft 82. This shaft is provided with a pinion 83 meshing with the rack 84 on the quill 22. Therefore when the clutch 75 is engaged the quill can be moved down on its feeding stroke at varying speeds or moved up or down with a rapid motion.

It will be seen therefore that by this invention the power and mechanism for driving the cutter spindle and for feeding or fast traversing the unit as a whole along the work and also for feeding the quill carrying the spindle for cutting and for raising the quill, are centered in a small space and carried by the unit itself and enclosed by it.

I prefer to apply this power by two electric motors, but some features of the invention are independent of this drive. By having one motor to drive the spindle and the second motor to drive the feeds and fast traverse, a high degree of flexibility is provided and the two motors can be run independently of each other or in cooperation by connecting them electrically as may be desired, and can be connected up so as to run at the same speed, or at two speeds, having any desired relation to each other. By this arrangement the power required to drive the whole machine is considerably reduced over previous arrangements. All the handles to control the desired actions are located on the head itself and they can be placed in a way that is very convenient for the operator.

The self-contained head has, incorporated in the design, features making it adaptable for drilling, boring, tapping, slotting and facing, as well as milling, without adding to its mechanism and obviously any desired tools and attachments can be applied, to meet special requirements.

The only revolving members visible are the cutter and the spindle nose carrying it. The parts are completely protected by the head.

This head can be used alone or in combination with other cutter carrying heads on the following types of milling machines or special machines: slab millers, open side millers, duplex millers, planer type millers with fixed or adjustable rails, rotary planer type millers, drum type millers, column or knee type millers, continuous type millers or special purpose type machines. In all cases it can be attached to some member carrying a work table which can move the work past the cutters or remain stationary while the cutters move past the work. The number of arrangements and types of heads will be determined by the work it is intended to do. So great is the variety of work adaptable for this unit head, either singly or in combination with others, that the member or members supporting the work and head or heads can be anything.

When used with other heads on the same machine, the several spindles can be arranged to rotate at the same speed if desired, or at different speeds of a certain ratio, or each head can be arranged to operate at any rate of feed or fast travel in either direction irrespective of the state of action of the other units.

Although I have illustrated and described only a single form of the invention I am aware of the fact that modifications can be made therein by any person skilled in the art without departing from the scope of the invention as expressed in the claims.

Therefore, I do not wish to be limited in these respects but what I do claim is:—

1. The combination with a machine tool having upright and horizontal guides, each provided with an operating means extending therealong, of a plurality of self-contained units mounted on said guides, some arranged vertically and some horizontally, each having a work spindle, means carried by each of said units for turning its work spindle, and means carried by each of said units for cooperating with its operating means and moving the unit along its guide and for cooperating with the work spindle to move it out and in, said means on the several units being arranged independently of the other units and adapted to operate the several units at individual speeds and without relation to the operation of the other units.

2. The combination with a machine tool frame, having a guide, and a self-contained unit adapted to be moved along the guide, of a driving motor, a feeding motor and a work spindle all carried by said unit, means operated by the driving motor for driving the spindle, means operated by the feeding motor for feeding the unit bodily along the guide, and means operated by the feeding motor for feeding the work spindle forward.

3. The combination with a machine tool frame, having a guide therealong, of a self-contained unit adapted to be moved along the guide, said unit having associated therewith a driving motor, a feeding motor and a work spindle, means connected with the driving motor for operating the spindle at a plurality of speeds for cutting, means connected with the feeding motor for moving the unit bodily along the guide forward and back, and means connected with the feeding motor for moving the work spindle forward at varying speeds and back.

4. In a machine of the character described, the combination with a support constituting a guide, and a screw carried by the support, of a self-contained unit mounted on said guide and movable bodily therealong, a cutter spindle carried by said unit, a motor on the unit connected with the cutter spindle to rotate it at fast and slow speeds, said motor being reversible, a second motor carried by the unit, change speed gearing connected with the second motor and carried within the unit and transmitting the rotation, a nut on the screw, and means connected with the change speed gearing adapted to rotate the nut to traverse the unit along the guide.

5. In a self-contained unit for a metal working machine, the combination with a casing having a motor mounted thereon, of three shafts parallel with the axis of the motor, means for driving one of said shafts from the motor, comprising gearing, means for driving the second shaft from the first one comprising a set of speed change gears, means for driving the third shaft at reduced speed from the second shaft, means on the third shaft for driving it in the opposite direction from the first shaft for quick return, and means operated by the third shaft for moving the unit bodily.

6. In a self-contained unit for a metal working machine, the combination with a casing having a motor mounted thereon, of three shafts, means for driving one of said shafts from the motor, means for driving the second shaft from the first one comprising a set of speed change gears, means for driving the third shaft from the second shaft, means on the third shaft for driving it in the opposite direction from the first shaft for quick return, a fourth shaft driven by the third shaft having a gear shiftable axially thereon, a stationary screw and rotatable nut, the screw passing through the casing and the nut carried within the casing for moving the unit along the screw, said nut having gear teeth thereon adapted to mesh with said slidable gear in one position thereof, a clutch carried by the slidable gear, and means connected with the clutch, when the slidable gear is out of mesh with the nut gear, for raising and lowering the cutter spindle.

7. In a machine of the character described, the combination with a support constituting a guide, and a screw carried by the support, of a self-contained unit mounted on said guide and movable bodily therealong, a cutter spindle carried by said unit, a motor on the unit connected with the cutter spindle to rotate it, a second motor carried by the unit, change speed gearing connected with the second motor and carried within the unit for transmitting the rotation at a plurality of different speeds, a nut on the screw, means connected with the change speed gearing adapted to rotate the nut to traverse the unit along the guide, a quill carrying said cutter spindle, means connected with the change speed gearing adapted to raise or lower the quill in accordance with the speed ratios of the change speed gearing, and means for preventing the connections between the nut and the quill being made at the same time.

8. In a self-contained unit for a metal working machine, the combination with a motor carried by the unit, three shafts arranged adjacent to the motor, the first shaft being connected with the motor and constituting a driving shaft, means for connecting the third shaft with the driving shaft through the second shaft comprising a set of change speed gearing, means for connecting the third shaft with the driving shaft directly for rapid reversal, a shaft directly driven by the third shaft, a sliding gear on the last named shaft having a clutch section thereon, a gear in position to be operated by the sliding gear and having connections for moving the unit bodily, a companion clutch section adapted for driving the gear when out of mesh with the said gear, a cutter spindle, means for rotating the cutter spindle carried by the unit, a quill for raising and lowering the cutter spindle and means connected with said second clutch section for raising and lowering the quill.

9. In a metal working unit, the combination with a casing, of two motors carried by said casing, a spindle in alignment with the axis of one of the motors, gearing between the shaft of that motor and the spindle for rotating said spindle at two different speeds, means for connecting the gearing to the spindle in two different ways for that purpose, gearing carried within the casing for feeding the unit bodily in a transverse direction, means connected with the other motor for operating the last named gearing, a quill carrying said cutter spindle for raising and lowering it, and means adapted to be connected with said last named gearing for operating the quill.

10. In a metal working unit, the combination with a casing, of two motors carried by said casing, a cutter spindle, gearing between the shaft of that motor and the spindle for rotating the spindle at different speeds, a feed nut carried within the casing for use in feeding the unit bodily in a transverse direction, means connected with the other motor for rotating the feed nut at a plurality of different speeds and in either direction, a quill carrying said spindle for raising and lowering it, and means adapted to be connected with said gearing only when the nut is disconnected therefrom for operating the quill.

11. In a self-contained unit for a metal working machine, the combination with a casing and a cutter spindle carried thereby, of a motor in axial alignment with the cutter spindle but not directly connected therewith, a gear connected with the motor for driving the spindle, a shaft having a gear meshing with the said gear, a second shaft driven directly by gearing from the first shaft, a third shaft located substantially between the first two shafts, but out of alignment therewith, and having two sets of gearing for driving the spindle at different speeds from the second shaft, all said shafts and gears being contained within said casing, and means for connecting and disconnecting the gearing to drive the spindle at either speed.

In testimony whereof I have hereunto affixed my signature.

LORA E. BEAMAN.